United States Patent
Diloreto

(10) Patent No.: US 11,214,648 B2
(45) Date of Patent: Jan. 4, 2022

(54) SPRAY FOAM BUILDING INSULATION FOR EXTERIOR APPLICATIONS

(71) Applicant: Salvatore A. Diloreto, Brantford (CA)

(72) Inventor: Salvatore A. Diloreto, Brantford (CA)

( * ) Notice: Subject to any disclaimer, the term of this patent is extended or adjusted under 35 U.S.C. 154(b) by 337 days.

(21) Appl. No.: 16/464,387

(22) PCT Filed: Nov. 28, 2017

(86) PCT No.: PCT/CA2017/051428
§ 371 (c)(1),
(2) Date: May 28, 2019

(87) PCT Pub. No.: WO2018/098570
PCT Pub. Date: Jun. 7, 2018

(65) Prior Publication Data
US 2021/0115184 A1    Apr. 22, 2021

Related U.S. Application Data

(60) Provisional application No. 62/427,510, filed on Nov. 29, 2016.

(51) Int. Cl.
| | |
|---|---|
| C08G 18/76 | (2006.01) |
| C08G 18/48 | (2006.01) |
| C08G 18/66 | (2006.01) |
| E04B 1/76 | (2006.01) |
| C08G 101/00 | (2006.01) |
| E04B 1/78 | (2006.01) |

(52) U.S. Cl.
CPC ..... C08G 18/7664 (2013.01); C08G 18/4829 (2013.01); C08G 18/6677 (2013.01); E04B 1/762 (2013.01); C08G 2101/00 (2013.01); C08G 2110/005 (2021.01); C08G 2110/0025 (2021.01); C08G 2110/0083 (2021.01); C08G 2330/00 (2013.01); E04B 1/78 (2013.01)

(58) Field of Classification Search
CPC ............... C08G 18/163; C08G 18/381; C08G 18/4829; C08G 18/6677; C08G 18/7664; C08G 2101/00; C08G 2110/0025; C08G 2110/005; C08G 2110/0083; C08G 2330/00; C08L 75/08; E04B 1/7604; E04B 1/762; E04B 1/78; E04F 13/14
See application file for complete search history.

(56) References Cited

U.S. PATENT DOCUMENTS

| | | | |
|---|---|---|---|
| 4,237,237 A | 12/1980 | Jarre | |
| 5,318,997 A * | 6/1994 | Okada | C08G 18/482 521/174 |
| 2009/0018228 A1* | 1/2009 | Mager | C08G 18/4837 521/154 |
| 2010/0256250 A1* | 10/2010 | Kruger | C09D 163/00 521/164 |
| 2014/0366480 A1* | 12/2014 | Smith | E04B 1/806 52/741.4 |
| 2015/0260331 A1* | 9/2015 | Shinohara | B32B 9/046 428/35.4 |

FOREIGN PATENT DOCUMENTS

EP    0 567 027    10/1993

OTHER PUBLICATIONS

International Search Report issued in parent international patent application No. PCT/CA2017/051428, dated Feb. 6, 2018, pp. 1-3.
Written Opinion issued in parent international patent application No. PCT/CA2017/051428, dated Feb. 6, 2018, pp. 1-10.

* cited by examiner

*Primary Examiner* — John M Cooney
(74) *Attorney, Agent, or Firm* — Jeffrey S. Melcher; Melcher Patent Law PLLC

(57) ABSTRACT

An open cell polyurethane foam is provided which has a cell size and structure which allows the foam to act as an air and water barrier while still having acceptable water vapour permeability. The foam preferably is produced using water as a blowing agent, and includes a mixture of open cell-promoting, and closed-cell-promoting surfactants so as to provide an open cell foam structure having a cell size of about 1 µm, a density of about 1.05 lb per cubic foot, and wherein the cell structure includes randomly occurring solid walls on some cells. The open cell polyurethane foams of the present invention are suitable for use as insulation on the exterior surfaces of a building.

21 Claims, 3 Drawing Sheets

SPRAY FOAM BUILDING INSULATION FOR EXTERIOR APPLICATIONS

FIELD OF THE INVENTION

The present invention relates to the field of insulation, and in particular, relates to the insulation of the exterior surfaces of residential, industrial, institutional or commercial buildings using polyurethane spray foam systems.

BACKGROUND OF THE INVENTION

In the construction of most buildings, and in particular, in residential housing applications, walls are constructed using structural lumber, such as 2×4, or 2×6 wood studs, to which an external sheathing of a wood or wood composite panel is applied. By insulating the cavities created in the stud walls using, for example, fibreglass batt insulation, R-values of between 10 and 20 can be obtained. Fibreglass baits, however, can allow air leakage around the batts (if not properly installed), and provide little resistance to air, water vapour or water permeability. As a result, the use of an air, water and water vapour barrier on the interior of the building is required. This prevents moist air from contacting the cool exterior wall, and creating condensation within the wall cavity.

Recently, the use of closed cell polyurethane foam has become more common in building construction applications. In these systems, the stud wall cavities are filled with a liquid spray foam material which expands to fill the wall cavity, or the material is applied to the outside of the wall. These types of products are generally applied on-site, and are the foamed reaction products of an isocyanate and a polyol which are reacted together to create the foamed product. Generally, the closed cell spray foamed material is applied using a hydrofluorocarbon (HFC) blowing agent so as to create a medium density closed cell material having a foam density of about 2 lb. per cubic foot and an R-value of 5 to 6.5 per inch. When a thickness of 2 inches or more is installed, this material typically acts as both a vapour barrier and an air barrier, and thus can prevent moisture from the interior of the building from reaching the cool exterior walls. As such, use of this thickness of a closed cell polyurethane foam can avoid the necessity for using an interior vapour barrier.

Compared to fibreglass batt insulation, these spray foam materials are generally superior at filling the voids in the wall cavity, and thus, they generally reduce the possibility of air leakages within the wall.

However, it should also be noted that the use of a lower density (e.g. 0.5 to 1.5 lb. per cubic foot), open cell material is not used in exterior wall applications, since the open cell material of the prior art, typically absorbs water, and/or does not act as a barrier to water or air. As such, while closed cell foamed polyurethane materials are used in interior and exterior application, the use of open cell foamed polyurethane materials has been generally limited to insulating internal wall cavities or other interior applications. Because of their typically lower cost, open cell foamed materials, which use less resin per unit volume, are typically preferred over closed cell materials. However, because of their water absorbing features, open cell materials are not suitable for external applications.

An external water barrier, such as a "house wrap" can also be provided on the external wall of the building, over a structural sheathing material, in order to prevent water or air from reaching or contacting the insulation. Known house wrap materials are water and air barriers, but are water vapour permeable in order to allow any water present in the wall, such as that formed by condensation, to escape from the wall cavity. However, to ensure that this type of external "house wrap" material is able to effectively act as an air barrier to minimize the amount of air movement within the walls, the seams where the house wrap film is joined, or is cut around openings in the building structure, must be taped. Taping of the joints between the house wrap film can take considerable time in order for it to be done properly.

Alternatively, in order to increase the R-value of the wall, non-structural exterior sheathing using rigid foam insulation boards can be used to construct the exterior wall. This exterior sheathing can be provided by, for example, expanded polystyrene (EPS), extruded polystyrene (XPS), or polyisocyanurate panels, having a thickness of between 0.5 to 2 inches, or more. These panels typically provide an additional R-value to the wall of about 5 and can be used on their own (with wall bracing), or used in combination with the wood composite panels, or the like.

An additional benefit of this approach is a reduction of a thermal bridging wherein heat is lost through the studs.

However, while exterior foam sheathing acts as a good insulator when added to walls, this type of approach also typically requires that any seams be taped to avoid air leakage. Improper taping, or failure of the tape; can lead to "reverse shingling" in which water can enter into the top of the taped seam and continue into the wall system, resulting in significant moisture-intrusion issues. Also, the sheathing may not provide an effective water barrier if not properly installed.

Further, heat expansion and contraction of the sheathing panels can result in gaps being formed between the panels over time, and/or buckling of adjacent panels is possible as the panels attempt to expand.

Combinations of the insulated sheathing and house wrap can also be used, but this approach would be costly, and labour intensive to cut, install and tape both systems.

Use of a closed cell polyurethane foam on the exterior of the building would also not be practical since this approach would establish a vapour barrier on the exterior of the building, and thus trap water within the wall cavities. Open cell foams of the prior art would also not be suitable since they would absorb water and/or fail to act as a barrier to the passage of water or water vapour.

To overcome these difficulties, it would be advantageous to provide an improved system for insulating the exterior surfaces of a building, in a manner that would facilitate the construction process. It would also be advantageous to provide a system wherein a spray foamed material could be used to insulate the exterior of a building. The use of such a system in combination with the use of a medium density, closed cell spray foam insulation on the interior of the building wall, would also be advantageous.

SUMMARY OF THE INVENTION

Accordingly, it is a principal advantage of the present invention to provide a spray foam material for use in insulating the exterior surfaces of a building. It is a further advantage of the present invention to provide an open cell, spray foam polyurethane insulating material that is suitable for use in insulating the exterior surfaces of a building. It is a still further advantage of the present invention to provide an open cell, spray foam insulating material for use in these applications, that acts as a water barrier, and in a more preferred embodiment, also acts as a material which is not air permeable. As such, it is a still further advantage of the present invention to provide a material which acts as an air and water barrier, while still being water vapour permeable.

It a yet still further advantage of the present invention to provide a process for insulating at least part of the external surfaces of a building, using an open cell polyurethane material that acts as a water and air barrier, while being water vapour permeable.

The advantages set out hereinabove, as well as other objects and goals inherent thereto, are at least partially or fully provided by the spray foam, and spray foam system, of the present invention, as set out herein below.

Accordingly, in one aspect, the present invention provides a polyurethane foam for use in insulating an exterior surface of a building, wherein said polyurethane foam has an open cell structure, and preferably has a foamed density of between 0.60 and 1.5 lb. per cubic foot. More preferably, the density of the foamed open cell polyurethane foam is between 0.90 and 1.20 lb. per cubic foot, and still more preferably between 1.00 and 1.15 lb. per cubic foot. Most preferably, the density of the foamed open cell polyurethane foam is about 1.05±0.1 lb per cubic foot.

Preferably, the open cell structure of the foams of the present invention have a structure wherein the cells are essentially open but include some randomly occurring, solid cell walls. Preferably, the open cell structure of the foams of the present invention is formed by a combination of surfactants that results in a surfactant interaction which produces both completely open and at least partially open, cell walls. If measured by a method such as ASTM D6226, the open cell content of the foams of the present invention is preferably greater than 95%, and more preferably, greater than 98%.

The size of the cell can vary depending on the materials used, and the amount of blowing agent, and the like, which is used. Preferably, the foams of the present invention have a cell size of between 0.03 μm, and 1.5 μm, and more preferably between 0.1 μm and 1.0 μm. Most preferably, the majority of cells have a cell size of 0.8±0.3 μm.

The insulating ability (for example the "R" value) of the foam is preferably such that the polyurethane foam of the present invention will provide an R value of between 2 and 6 per inch of thickness, and more preferably, between 3 and 5 per inch of thickness. As such, typical "R" values would be between the ranges of 4 and 12 for a 2 inch thickness foam.

In an exemplary implementation of the present invention, an isocyanate resin (Component A) is mixed with a polyol composition (Component B), while being heated, so that the two components react and foam. Preferably, the two components are mixed in the spray nozzle of a spray gun.

In a second aspect, the present invention provides a semi-rigid, polyurethane foam, for use in insulating an exterior surface of a building, wherein said sprayed polyurethane foam has an open cell structure and density, as previously described with respect to the present invention.

In a third aspect, the present invention provides a method for insulating the exterior surface of a building comprising spraying the exterior surface of the building with the foamed reaction mixture of an isocyanate and a polyol in order to produce a polyurethane foam having an open cell structure and density, as previously described with respect to the present invention.

DETAILED DESCRIPTION OF THE PREFERRED EMBODIMENTS

In the present application, the term "open cell, foamed polyurethane" refers to polyurethane materials having a cell structure which is at least partially open, and thus, has few, if any, fully entrained voids (e.g. closed cells) within the polyurethane material. While the number of open cells is preferably greater than 98%, lower levels might also be of some value. As such, the level of entrained voids in the foams of the present invention might be as high as 50%, by number, of the total number of cells in the foam. More preferably however, the level of entrained voids in the polyurethane foam is less than 25% by number, and still more preferably, less than 10%, by number.

The general production methods to produce polyurethane foams are well known to the skilled artisan, as is the general chemistry for production thereof. As such, these will not be described in any specific detail Depending upon the type of foam structure that is required by a specific application, the isocyanate and/or polyol resin systems may be selected according to their molecular weight. For example, low molecular weight materials tend to promote the formation of a more rigid material. To achieve a semi-rigid material, typically, a medium molecular weight resin system is typically used. To achieve a flexible foam, a high molecular weight resin system would preferably be used. However, this selection approach is merely a guideline as to the proper selection of resin components. As such, the flexibility of the polyurethane foam can, to a certain extent, be controlled by selection of a resin having an appropriate molecular weight. For the purposes of the present invention, all of the above types of polyurethane foams can be used. However, semi-rigid foam materials are particularly preferred.

With respect to the isocyanate, or "A" Component, low molecular weight isocyanate materials would contain from 20 to 35% isocyanate content. Medium molecular weight resins preferably contain from 12 to 20% isocyanate content, and high molecular weight resins preferably contain from 2 to 12% isocyanate content. All percentage values are by weight unless otherwise stated.

The isocyanate component of the polyisocyanate preferably has a functionality of 2.0 or more, and more preferably, a functionality of between 2.0 and 3.0, and can include diisocyanates and polyisocyanates of the aliphatic, alicyclic, or aromatic types.

The amount and type of isocyanate monomer used, or used in the production of the isocyanate resin component can directly affect the level of isocyanate groups present in the resin component. For example, hexamethylene diisocyanate (HDI), has a monomeric level of isocyanate of 50% NCO. Other materials will have different monomeric NCO levels, such as, for example, Bis-(4-Isocyanatocyclohexyl) methanes (H12MDI) at 31.8% NCO; isophorone diisocyanate (IPDI) at 37.5% NCO; toluene diisocyanate (TDI) at 48% NCO; or methyl diphenyl diisocyanate (MDI) at 28-34% NCO. When reacted to form the isocyanate resin component, the monomeric NCO level will affect the isocyanate level of the resulting resin material.

The isocyanate is preferably an isocyanate selected from MDI, TDI, hexamethylene diisocyanate (HMDI), HDI, IPDI, TMXDI (1,3-bis-isocyanato-1-methylene ethylene benzene), or any of their oligomers, pre-polymers, dimmers, trimers, allophanates and uretidiones.

However, other polyisocyanates useful as the isocyanate resin component include, but are not limited to, toluene-2, 4-diisocyanate, toluene-2,6-diisocyanatecommercial mixtures of toluene-2,4- and 2,6-diisocyanates, ethylene diisocyanate, ethylidene diisocyanate, propylene-1,2-diisocyanate, cyclohexylene-1,2-diisocyanate, cyclohexylene-1,4-diisocyanate, m-phenylene diisocyanate, 3,3'-diphenyl-4,4'-biphenylene diisocyanate, 4,4'-biphenylene diisocyanate, 3,3'-dichloro-4,4'-biphenylene diisocyanate, 1,6-hexamethylene diisocyanate, 1,4-tetramethylene diisocyanate, 1,10-decamethylene diisocyanate, 1,5-naphthalenediisocyanate, cumene-2,4-diisocyanate, 4-methoxy-1,3-phenylenediisocyanate, 4-chloro-1,3-phenylenediisocyanate, 4-bromo-1,3-phenylenediisocyanate, 4-ethoxy-1,3-phenylenediisocyanate, 2,4'-diisocyanatodiphenylether, 5,6-dimethyl-1,3-phenylenediisocyanate, 2,4-dimethyl-1,3-phenylenediisocyanate, 4,4'-diisocyanatodiphenylether, benzidinediisocyanate, 4,6-dimethyl-1,3-phenylenediisocyanate, 9,10-anthracenediisocyanate, 4,4'-diisocyanatodibenzyl, 3,3'-dimethyl-4,4'-diisocyanatodiphenylmethane, 2,6-dimethyl-4,4-diisocyanatodiphenyl, 2,4-diisocyanatostilbene, 3,3'-dimethyl-4,4'-diisocyanatodiphenyl, 3,3'-dimethoxy-4,4'-diisocyanatodiphenyl, 4,4'-methylene bis (diphenylisocyanate), 4,4'-methylene bis (dicyclohexylisocyanate), isophorone diisocyanate, PAPI (a polymeric diphenylmethane diisocyanate, or polyaryl polyisocyanate), 1,4-anthracenediisocyanate, 2,5-fluorenediisocyanate, 1,8-naphthalenediisocyanate and 2,6-diisocyanatobenzfuran.

Also suitable are aliphatic polyisocyanates such as the triisocyanate Desmodur N-100 sold by Bayer which is a biuret adduct of hexamethylenediisocyanate; the diisocyanate Hylene W sold by du Pont, which is 4,4'-dicyclohexylmethane diisocyanate; the diisocyanate IPDI (Isophorone Diisocyanate sold by Thorson Chemical Corp.), which is 3-isocyanatomethyl-3,5,5-trimethylcyclohexyl isocyanate; or the diisocyanate THMDI sold by Verba-Chemie, which is a mixture of 2,2,4- and 2,4,4-isomers of trimethyl hexamethylene diisocyanate.

Further examples of suitable isocyanate components include 2,4-tolylenediisocyanate, 2,6-tolylenediisocyanate, 4,4'-diphenylmethanediisocyanate, 4,4'-diphenylthere-diisocyanate, m-phenylenediisocyanate, 1,5-naphthalene-diisocyanate, biphenylenediisocyanate, 3,3'-dimethyl-4,4'biphenylenediisocyanate, dicyclohexylmethane-4,4'diisocyanate, p-xylylenediisocyanate, bis(4-isocyanatophynyl) sulfone, isopropylidene bis(4-phenylisocyanate), tetramethylene diisocyanate, isophorone diisocyanate, ethylene diisocyanate, trimethylene, propylene-1,2-diisocyanate, ethylidene diisocyanate, cyclopentylene-1,3-diisocyanates, 1,2-, 1,3- or 1,4 cyclohexylene diisocyanates, 1,3- or 1,4-phenylene diisocyanates, polymethylene ployphenylleisocyanates, bis(4-isocyanatophenyl)methane, 4,4'-diphenylpropane diisocyanates, bis(2-isocyanatoethyl) carbonate, 1-methyl-2,4-diisocyanatocyclohexane, chlorophenylene diisocyanates, triphenylmethane-4,4'4"-triisocyanate, isopropyl benzene-a-4-diisocyanate, 5,6-diisocnanatobutylbicyclo [2.2.1]hept-2ene, hexahydrotolylene diisocyanate, 1-methoxyphenyl-2, 4-diisocyanate, 4,4'4"-triphenylmethane triisocyanate, polymethylene polyohenylisocyanate, tolylene-2,4,6-triisocyanate, 4,4'-dimethyldiphenylmethane-2,2'5,5'-tetraisocyanate, and mixtures thereof.

Preferably, however, the isocyanate component of the polyurethane foam is selected from the group consisting of methyl diphenyl diisocyanate (MDI), polymeric methyl diphenyl diisocyanate (PMDI), toluene diisocyanate (TDI), hexamethylene diisocyanate (HMDI), hexamethylene diisocyante (HDI), isophorone diisocyanate (IPDI), TMXDI (1,3-bis-isocyanato-1-methylene ethylene benzene), or any of their oligomers, pre-polymers, dimmers, trimers, allophanates and uretidiones.

The polyol portion, or "B" Component, of the polyurethane foam can be any suitable polyol commonly used within the art, and can include aliphatic or aromatic polyols, including polyester, polyether, sucrose-based polyols, glycerine-based polyols, caprolactone-based polyols, and the like. The polyols include materials such as glycerol, 3-(2-hydroxyethoxy)-1,2-propanediol, 3-(2-hydroxypropoxy)-1, 2-propanediol, 2,4-dimethyl-2-(2-hydroxyethoxy)-methyl-pentanediol-1,5, 1,2,6-hexanetriol, 1,1,1,-trimethylolpropane, or the like, or can be made by any suitable production method which would typically and preferably involve reacting ethylene oxide (EO), propylene oxide (PO) or butylene oxide (BO) with materials such as: 1,1,1-tris[(2-hydroxyethoxy)methyl]ethane, 1,1,1,-tris-[(2-hydroxypropoxy)methyl]propane, triethanolamine, triisopropanolamine, pyrogallol or phloroglucinol, in order to form a chain-extended polyol.

Commercial examples of suitable chain-extended polyols include polyether triols such as XD 1421, produced by the Dow Chemical Company, or Pluracol V-7 made by BASF Wyandotte, sucrose/glycerine polyol such as Jeffol SG-360 from Huntsman, polyether polyols such as Pluracol 492 from BASF Wyandotte, saturated polyester polyols such as Desmophen 2500 from Bayer, or castor oils such as DB castor oil or regular commercial grades of castor oil.

Additionally, polybutadiene resins, such as Poly BD R45T, available from Sartomer, can also be used.

As such, a wide variety of polyols might be used. Moreover, combinations of various polyols, or even different types of polyols, might also be used.

The ratio of isocyanate resin to polyol is typically identical to the ratios normally used in the prior art to cure these types of polymer systems. Preferably, however, the ratio of the isocyanate to polyol mixture (Component A to Component B) is in the amount of from 0.5 to 5:1, by weight, and more preferably in the ratio of from 0.75 to 3:1. More preferably, the ratio is between 0.9 to 1.1:1. For PMDI, that ratio of PMDI to polyol is typically and preferably, about 1:1. The skilled artisan will be aware that these ranges will vary, however, depending on the resins selected, and on the desired properties of the polymer system.

Further, as is known in the art, the foam structure of the polyurethane material is preferably provided by a blowing agent which acts to form the voids within the polyurethane as it reacts and solidifies. The nature, types and amounts of blowing agents which are used in polyurethane foam manufacture are well known to those skilled in the art, but can include, for example, water, carbon dioxide, hydrofluorocarbons (HFCs), chlorinated fluorocarbons, hydrofluro olefins (HFOs), and the like.

The foaming process can occur when, for example, the polymeric MDI resin from the blended pre-polymer resin reacts with moisture (water) which causes carbon dioxide gas to be liberated. Water can be added to the reaction system, or can be intrinsic when includes as part of the polyol (Component B) material.

Typically, water is the preferred blowing agent for formulations of the present invention. In the formulations used for preparing the polyurethane foams of the present invention, water will be present at a concentration of from 0.75 to 20 weight percentage of B-side component. More preferably, water is present at from 3.0 to 12.0 weight percentage of B-side component. Even more preferably, water is present at from 5.0 to 10.0 weight percentage of B-side component.

Alternatively, other blowing agents can be used, or combined with water, in order to generate a gaseous material during the curing reaction. While carbon dioxide is a preferred gas for generation, other gases such as nitrogen, pentane, HFOs, HFCs, or the like, may be released, or directly used, in order to form a foam with the desired density and cell shape and size.

The amount of non-aqueous blowing agent, if used, is typically less than 10%, by weight, of the formulation, and more preferably, is between 2 and 8% by weight. The total amount and type of blowing agent is selected however, so as to provide a polyurethane foam having the desired density range.

The material of the present invention can be foamed under atmospheric conditions, but might also be produced in a system which is under a compressive pressure. Under these conditions, compression pressures of 0 to 1,500 psi (0 to 105.5 kg/cm2) can be applied.

Preferably, the open cell polyurethane foam is reacted so that, once foamed, an essentially fully cured polyurethane material is provided. As such, the polyurethane foam will not "off gas" to any appreciable extent. Usually this is accomplished by having a slight stoichiometric excess of isocyanate present in the reaction mixture. However, those skilled in the art would be aware of techniques to achieve this state.

The polyurethane foam material of use in the present invention can also be custom formulated and engineered for specific applications. The range of formulations includes using rigid, semi-rigid, or more preferably semi-flexible or flexible, polyurethane foams that may include a range of organic and inorganic reinforcing materials which may be in the form of a particle or fiber with the said reinforcing materials being in a variety of densities, sizes and regular and irregular shapes.

Additionally, other additives such as catalysts or surfactants, or the like, can be added to the reaction mixture in order to control various properties of the polyurethane foam.

Catalysts, when used, can be amine based, including, for example, primary, secondary or tertiary amines, non-emissive hydroxyl amines, or combinations thereof. The catalysts can also be metallic based, including, for example, tin, lead, bismuth based catalysts, or the like. Catalysts can be used which promote the formation of urethane linkages in the polyurethane based systems, by reaction of isocyanate groups and hydroxyl groups. These types of amine catalysts include, for example, triethylenediamine, N-methylmorpholine, tetramethyl-2,4-butanediamine, N-methylpiperazine, dimethylethanolamine, dimethylaminoethoxy ethanol, triethylamine, and the like; and organometallic compounds, such as stannous octanoate, dibutyltin dilaurate, dibutyltin di-2-ethylhexanoate, and the like.

The catalysts may be used alone or in combination with one another. The amount of catalyst typically used is a broad range of amounts, which usually ranges from 0.02 to 6.0 parts by weight, of the B-side component, and preferably between 1 to 5 parts by weight based on the total weight of the B-side component, exclusive of the reinforcing materials.

Surfactants are also preferably included to provide the proper cell structure, and these are preferably silicone based. However, any suitable surfactants might be used. By introducing surfactants, the foam: materials can be caused to make more cells, and by proper selection of surfactants, the preferred combination of open and partially-closed cell configurations of the present invention can be achieved.

Preferred surfactants include combinations of cell opening-promoting surfactants like Evonik TEGOSTAB B8523, B8580, B84710, B8870, Ortegol 204, Ortegol 500, and Ortegol 501, and closed cell-promoting surfactants like Evonik TEGOSTAB B8408, B8453, and B8487. Preferably, the systems of the present invention include combinations of these types of surfactants to produce open cells have some randomly occurring, solid cell walls.

The total amount of surfactants present is preferably between 0.1 and 10% by weight of the B-side component, and more preferably, between 1 and 6%, by weight. Most preferably, the weight of the surfactant is between 2 and 4% by weight of the B-side component.

The mixture of open cell and closed cell promoting surfactants, in the total surfactant added, is preferably such that the open cell promoting surfactant accounts for between 10 to 90% by weight of the surfactant mixture. More preferably, the level of open cell promoting surfactant in the surfactant mixture is between 50 and 80%, by weight. Most preferably, the level of open cell promoting surfactant in the surfactant mixture is between 55 and 75%.

The amount and ratio of the surfactant types is selected to provide the desired cell size, foam density, and amount of essentially open cells with some cells including some randomly occurring, solid cell walls.

Where uniformity of cell structure is required, fine organic or inorganic particles in a size range between 50 and 500 microns, may be added.

Other materials can be included in the formulations of the present invention. For example, coupling agents, such as silane or titanates, may also be included in the preparation of the composition to improve the physical properties of the material. Where other properties are desired, additional additives may be added to the composition including colorants, dry or liquid inks or pigments, fire and flame retardants, UV absorbers and protectants, antistatic agents, and such other additives as required, and which are known within the industry.

The open cell polyurethane foam of the present invention can also include a continuous "skin" portion formed an one or more surfaces of the foam. The skin provides a smooth surface that can prevent ingress of water, and thus can act as a water barrier, and aids initially in causing water to bead off of the surface of the foam. However, the skin is not a solid structure, and should not act to significantly affect the ability of water vapour to pass through the open cell polyurethane foam material.

With its improved features of being a water barrier, and an air barrier, while being water-vapour permeable, the present invention is well suited for being primarily directed to the use of open cell polyurethane foams on exterior surfaces of a building. As such, in a further aspect, the present invention provides for the use of an open cell polyurethane foam for insulation of the exterior surfaces of a building, wherein the open cell polyurethane foam is as herein defined, with respect to the present invention.

In this respect, the exterior surface of the building is to be considered to be the surface outside of the building sheathing or the like, but behind the outer surface of the building. The outer surfaces covering the open cell polyurethane foam are typically brick, wood, wood or wood composite siding, vinyl or aluminum siding, or any other suitable building exterior surface.

Also, while the present invention is primarily described with respect to its use on exterior walls, it will be clear that other surfaces, such as roofs, or floors can be treated in a similar manner, and are not excluded from the present invention.

Further, the present invention is primarily directed to its use in residential buildings. However, use of the present invention in industrial, institutional or commercial buildings is not excluded from the present invention.

In a still further aspect, the present invention also provides a method for insulating a building comprising applying an open cell polyurethane foam to an exterior surface of the building, wherein said open cell polyurethane foam is produced by spraying a mixture of an isocyanate and a polyol onto the exterior surface, and allowing the sprayed mixture to foam, in order to produce the open cell polyurethane foam which has been previously defined, with respect to the present invention. As such, the present invention provides for use of a polyurethane foam, for insulating an exterior surface of a building, wherein said polyurethane foam is a foam as previously described with respect to the present invention.

In a most preferred option, the present invention provides a method for insulating a building wherein a closed cell polyurethane foam is used to insulate a wall cavity or interior surface of a building wall, and an open cell polyurethane foam, of the type defined herein, is used to insulate the exterior surface of the wall. As such, the present invention provides for insulating a building wherein said open cell polyurethane foam is used to insulate the exterior surface of a wall of said building, and a closed cell polyurethane foam is used to insulate the interior surface of said wall.

It should be noted that the phrase "open cell" as used herein with reference to foams of the present invention indicates that substantially all cells have at least one cell wall which is at least partially open, or ruptured, so that gas, and in particular, water vapour, may escape from the foam structure. However, the entire foam, as a whole, acts to prevent the passage of liquid water, or the passage, of air, and thus acts as a water and air barrier.

The open cell structure is also preferably non-shrinking, since the cell structure is not influenced by the expansion and contraction of gas bubbles, as can be seen in some closed cell foam materials.

It should also be noted that the open cell polyurethane foam of the present invention can be used in combination with other materials. This includes, for example, use with a non-structural insulating sheathing or the like, wherein the open cell polyurethane foam is used in place of the tape normally used to seal the joints between the sheets of sheathing. In this case, the open cell polyurethane foam of the present invention is easily and rapidly sprayed onto the joints of the sheathing material in order to seal these joints. As such, the present invention also provides a method for insulating wherein said open cell polyurethane foam is used in place of tape to seal a sheathing material.

BRIEF DESCRIPTION OF THE DRAWINGS

Embodiments of this invention will now be described by way of example only in association with the accompanying drawings in which.

DETAILED DESCRIPTION OF THE PREFERRED EMBODIMENTS

Figure 1:
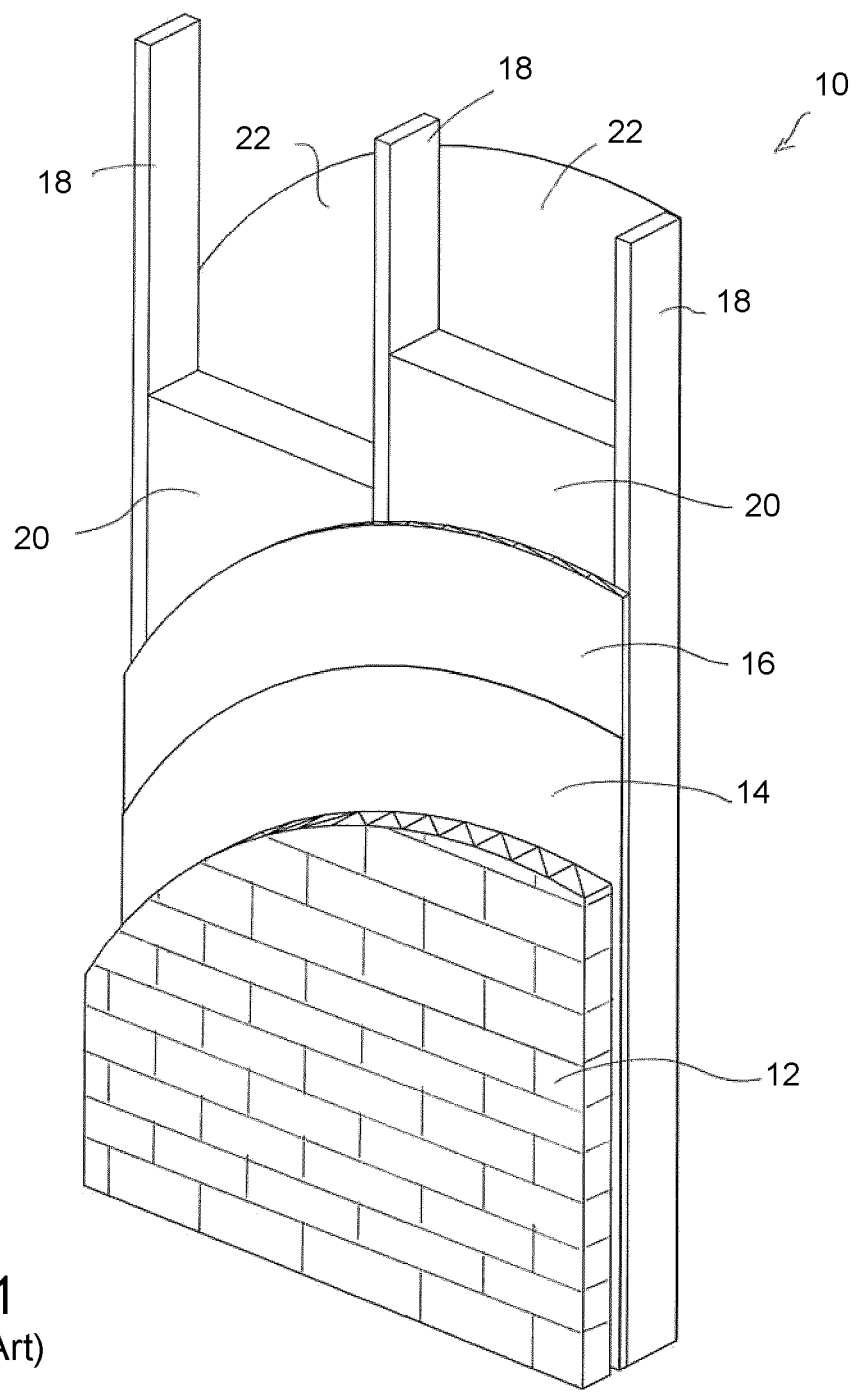
FIG. 1 is a perspective, cutaway drawing of an example of an exterior building wall, insulated according to the prior art.

The novel features which are believed to be characteristic of the present invention, as to its structure, organization, use and method of operation, together with further objectives and advantages thereof, will be better understood from the following drawings in which a presently preferred embodiment of the invention will now be illustrated by way of example only. In the drawings, like reference numerals depict like elements.

It is expressly understood, however, that the drawings are for the purpose of illustration and description only and are not intended as a definition of the limits of the invention. Also, unless otherwise specifically noted, all of the features described herein may be combined with any of the above aspects, in any combination.

Referring to FIG. 1 the construction of a typical exterior wall 10 according to the prior art, is shown. Wall 10 includes an exterior layer 12, which could be a layer of vinyl siding, or other suitable material, such as a brick facing. Exterior layer 12 is adjacent to a house wrap lay 14, which is used to cover a structural wall sheathing material 16 selected from plywood, OSB, particle board, or the like. This sheathing material is attached to wooden studs 18.

The cavity formed between wooden studs 18 is filled with fibreglass batt insulation 20, and a polyethylene film vapour barrier 22 is layered on the inside of fibreglass batt insulation 20.

Numerous variations on this construction approach are known, but the example shown in FIG. 1 is typical of a large majority of residential houses.

Figure 2:
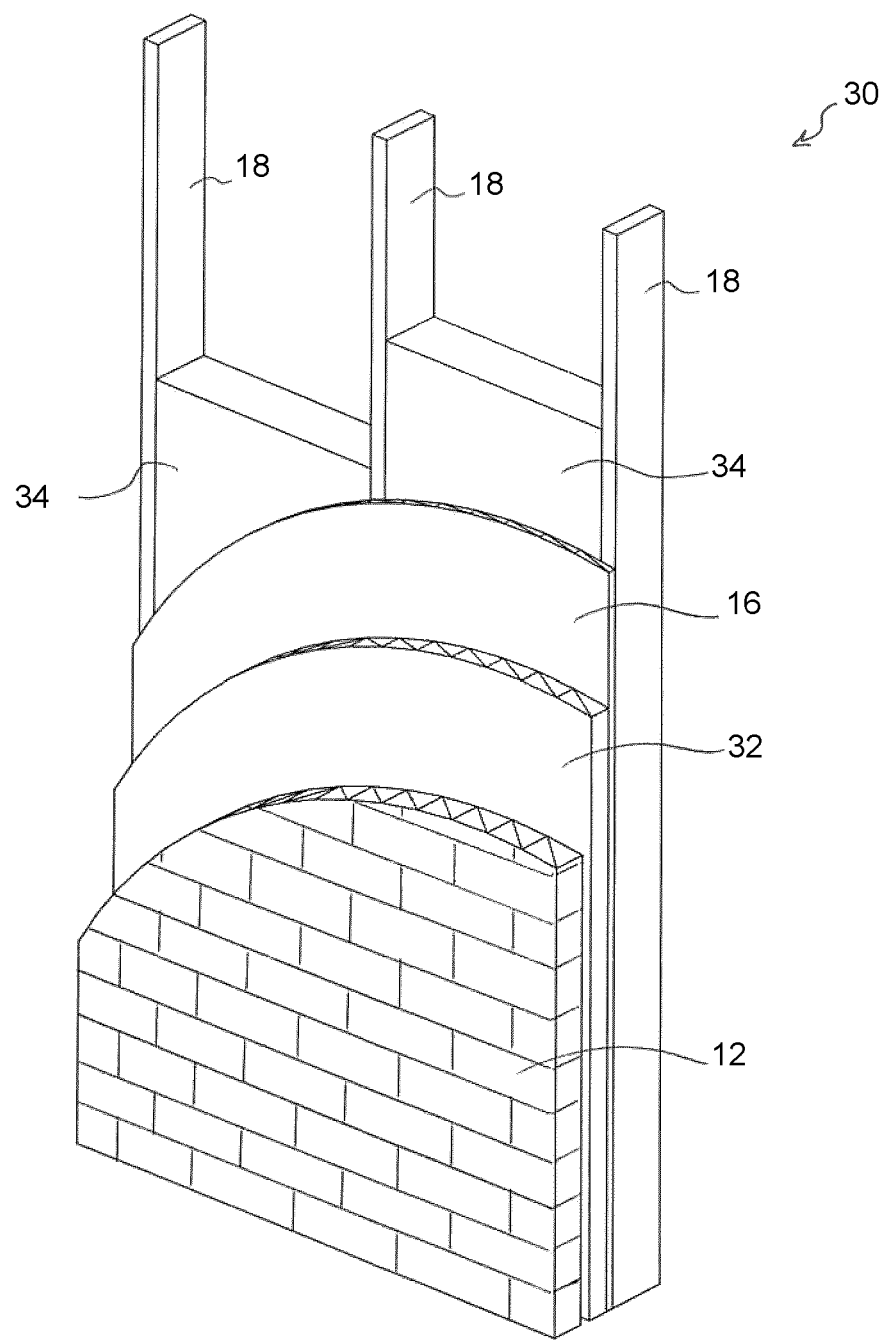
FIG. 2 is a perspective, cutaway drawing of an example of an exterior building wall, insulated according to the present invention.

In FIG. 2, a representation of an exterior wall 30 assembled in accordance with the present invention, is shown. Wall 30 includes an exterior layer 12 which is the same as for FIG. 1. Layer 12 covers an open cell polyurethane foam layer 32, of the present invention, which has been sprayed onto a structural sheathing material 16. Since foam layer 32 is capable of acting as a water and air permeable layer, the need for a house wrap layer 14, is eliminated.

Structural sheathing material 16 is attached to wooden studs 18, and the cavity between wooden studs 18 is filled with a closed cell polyurethane foam resin 34. Because closed cell polyurethane foam resin 34 acts as a vapour barrier, the need for a separate polyethylene film vapour barrier layer 22, is eliminated.

During construction, wooden studs 18 are assembled, and covered with sheathing material 16. At this point, the cavity between wooden studs 18 can be rapidly and easily filled with the closed cell polyurethane foam 34. No additional vapour barrier is required.

The outside f sheathing material 16 is sprayed with an open cell foam material 32 which acts as an insulating layer which is a water and air barrier, but which allows for the passage of any water vapour that might form or collect, on the inside of the wall structure. The exterior layer can then be applied to the exterior of the wall, in a known manner.

By spraying the open celled foam material on the outside of the building, significant time can be saved when compared to applying house wrap (with taping) and/or when compared to use of a non-structural insulation sheathing material (again with taping).

When combined with the use of a sprayed-on layer of a closed cell insulating material on the inside of the wall cavity (with the elimination of the handling of fibreglass batts, and the use of a vapour barrier), significant time savings can also be achieved.

As such, the present invention permits for the rapid completion of at least the exterior wall of a building, and when used in combination with a closed cell polyurethane foam on the interior wall, allows a complete wall structure to be completed in a rapid, and cost effective, fashion.

EXAMPLES

An open cell polyurethane foam of the present invention was prepared for testing. The foam produced was prepared using a 1:1 by weight mixture of PMDI isocyanate resin, such as Mondur MR Light from Covestro, or Rubinate M from Huntsman, as the Part A component, in combination with Wrapsulate Part B, as the B component, which material is a mixture having 44% (all by weight of the B component) of a blend of sucrose and polyether based polyols, 40% of an 80% blend of tris(1-chloro-2-propyl)phosphate (TCPP) and 20% of a tetrabromophthalate diol flame retardants, 3% of a 60/40 blend of an open-cell-promoting silicone surfactant such as TEGOSTAB B8523, B8580, B84710, B8870, Ortegol 204, Ortegol 500, and Ortegol 501, from Evonik, and closed cell-promoting surfactants like TEGOSTAB B8408, B8453, and B8487 from Evonik. Also present is 5% of blend of an amine-based and tin dilaurate-based catalyst, by weight of the B component. The balance of Component B is 8% added water.

Wrapsulate Part B is commercially available from Elastochem Specialty Chemicals Inc, of Brantford, Ontario, Canada.

The two components were heated and mixed together in a heated spray gun, and then sprayed onto a wooden substrate and allowed to foam. Samples of the resultant foam, referred to as Wrapsulate (Trade mark) foam, were cut from the sprayed foam,—both with and without a foam skin, and tested for their suitability for exterior construction applications. In order to assess the density variation of the sprayed foam, samples were obtained from various locations within one of the boards. The foam was taken from boards with the OSB as a substrate. The properties of the specimens used for further testing, are shown in Table 1.

TABLE 1

List of Specimens Prepared

| Test Type | Length (mm) | Width (mm) | Thickness (mm) | # of Specimens | Location in Thickness |
|---|---|---|---|---|---|
| Density | 25 | 25 | 25 | 12 | Top, core, and bottom from four locations |
| Thermal Testing | 300 | 300 | 300 | 6 | Six 50 mm thick specimens (no skin) |
| Water Vapour/Air Permeability | Circular | 150 (Dia.) | Full Insulation | 6 | Three with skin, and three without skin |
| Compressive Strength | 150 | 150 | 50 | 5 | All from core |
| Flexural Strength | 300 | 100 | 25 | 6 | All From core |
| Tension | 150 | 150 | Full Insulation | 6 | Six with skin |
| Dimensional Stability | 100 | 100 | Full Insulation | 6 | Full insulation (including skin) |
|  | 100 | 100 | Full Insulation | 6 | Full Insulation (without skin) |
| Water Absorption | 150 | 150 | Full Insulation | 5 | full insulation (including skin) |
|  | 150 | 150 | Full Insulation | 5 | Full Insulation (without skin) |
| Sorption Isotherm | 150 | 150 | 50 | 5 | 50 mm thick with skin |

The density of the prepared specimens was measured after they were dried at a temperature of 40° C. The mass and dimensions of the specimens were measured. The results of the measurements are shown in Table 2.

TABLE 2

Dimensions, Masses and Densities of Specimens

|  | Thickness (mm) | Length (mm) | Width (mm) | Mass (g) | Density (kg/m$^3$) |
|---|---|---|---|---|---|
| 511-10-AB | 27.43 | 27.91 | 27.50 | 0.398 | 18.91 |
| 511-10-AC | 27.71 | 27.57 | 27.51 | 0.363 | 17.27 |
| 511-10-AT | 27.62 | 27.58 | 27.72 | 0.457 | 21.64 |
| 511-10-BB | 27.68 | 27.70 | 27.48 | 0.400 | 18.98 |
| 511-10-BC | 27.25 | 27.61 | 27.92 | 0.356 | 16.95 |
| 511-10-BT | 28.12 | 27.30 | 27.41 | 0.371 | 17.63 |
| 511-10-CB | 27.67 | 27.72 | 27.64 | 0.394 | 18.59 |
| 511-10-CC | 28.05 | 27.62 | 27.86 | 0.357 | 16.54 |
| 511-10-CT | 27.83 | 27.72 | 27.58 | 0.368 | 17.29 |
| 511-10-DB | 27.54 | 28.36 | 27.59 | 0.408 | 18.93 |
| 511-10-DC | 27.39 | 26.48 | 27.15 | 0.330 | 16.76 |
| 511-10-DT | 27.82 | 27.06 | 27.42 | 0.384 | 18.61 |

The density was approximately 1 lb per cubic foot (or 16.0185 kg per cubic meter).

Thermal Testing

The specimens used for this set of thermal conductivity measurements were exposed to 23±1° C. and 50±5% Relative Humidity (RH) for a period of 13 days and then the thermal conductivity was measured.

Tests were conducted in accordance with the ASTM standard C518 (ASTM International 2010). The specimen was tested in an apparatus with a 300 mm×300 mm cross section. Heat flow was perpendicular to this major surface. The heat flow apparatus used to conduct the reported tests has measurement uncertainties within 2%. Three specimens were tested at a mean temperature of 24.1° C. The results are shown in Table 3. The average thermal conductivity was 0.0354 W m$^{-1}$, K$^{-1}$. The average R value per inch in imperial units was 4.13.

TABLE 3

Thermal Conductivity 14 days after specimens were sprayed

|  | Thickness | SI UNITS | | |
|---|---|---|---|---|
| Specimen | (mm) | R (K m$^2$/W) | R/L (K m/W) | k (W/m K) |
| 511-1-A | 25.46 | 0.72 | 28.2 | 0.0352 |
| 511-1-B | 25.90 | 0.73 | 28.2 | 0.0355 |
| 511-1-C | 25.83 | 0.73 | 28.2 | 0.0354 |
| Average |  | 0.73 | 28.17 | 0.0354 |
| STDEV |  | 0.00 | 0.00 | 0.0002 |

Aging of Insulation Specimens

The thermal aging of the insulation were also assessed by subjecting the specimens to an exposure of 60° C. for a period of 90 days. The results of the test are shown below in Table 4. The table shows little change in the thermal resistivity of the specimens subject to 60° C. for 90 days. The total drop in thermal resistance of all the specimens was below 1%.

TABLE 4

Initial Measurements for Aging

| | Specimen | R | | % Change | k |
|---|---|---|---|---|---|
| | ID 511-13 | m$^2$K/W | % R | R | W/m$^2$K |
| Before exposure | A | 0.75 | | | 0.0351 |
| | B | 0.75 | | | 0.0349 |
| | C | 0.75 | | | 0.0352 |
| | Average | 0.75 | | | 0.0350 |

TABLE 4-continued

Initial Measurements for Aging

| | Specimen | R | | % Change | k |
|---|---|---|---|---|---|
| | ID 511-13 | $m^2K/W$ | % R | R | $W/m^2K$ |
| Post 60° C./90 day | A | 0.75 | 99.7 | −0.3 | 0.0352 |
| | B | 0.74 | 99.4 | −0.6 | 0.0351 |
| | C | 0.75 | 99.6 | −0.4 | 0.0353 |
| | Average | 0.75 | 99.6 | −0.4 | 0.0352 |

Water Vapour Permeability

Water vapour permeability testing was conducted following the procedure in the ASTM Standard E96/96M (ASTM International 2010). For each test condition, a set of 3 circular specimens, having a 150 mm diameter, were tested. The results of these measurements are shown in Table 5.

TABLE 5

Water Vapour Permeability Measurements

| Relative | Permeability (kg/m*s*Pa) | |
|---|---|---|
| Humidity (%) | No skin | With skin |
| 10 | $3.06 \times 10^{-11}$ | $2.29 \times 10^{-11}$ |
| 20 | $3.68 \times 10^{-11}$ | $2.75 \times 10^{-11}$ |
| 30 | $4.10 \times 10^{-11}$ | $3.06 \times 10^{-11}$ |
| 40 | $4.43 \times 10^{-11}$ | $3.30 \times 10^{-11}$ |
| 50 | $4.71 \times 10^{-11}$ | $3.50 \times 10^{-11}$ |
| 60 | $4.95 \times 10^{-11}$ | $3.67 \times 10^{-11}$ |
| 70 | $5.16 \times 10^{-11}$ | $3.82 \times 10^{-11}$ |
| 80 | $5.36 \times 10^{-11}$ | $3.96 \times 10^{-11}$ |
| 90 | $5.53 \times 10^{-11}$ | $4.09 \times 10^{-11}$ |
| 100 | $5.70 \times 10^{-11}$ | $4.21 \times 10^{-11}$ |

Figure 3:
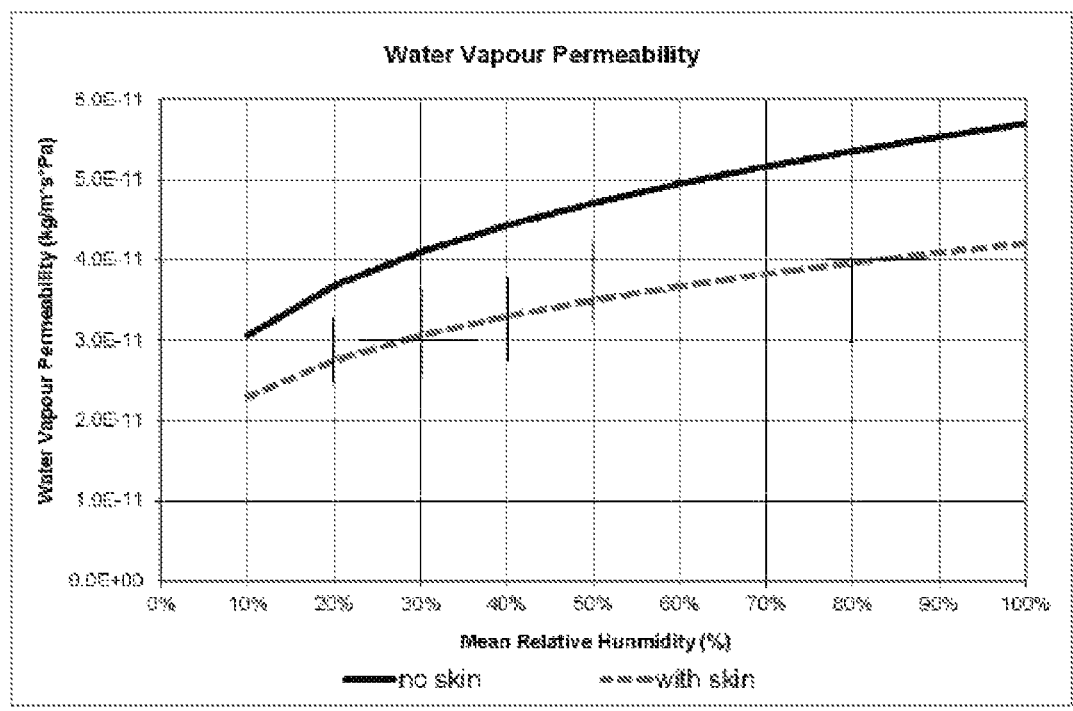
FIG. 3 is a graph of the water vapor permeability.

These results are also plotted in FIG. 3.

Comparison of WVP to Other Materials

A comparison of the Wrapsulate foam to several other materials is shown in Table 6. These results show a correlation between the types of materials, their densities and thus, cell size, of the foam and the resultant water vapour permeability. Generally, as density of the polyurethane foam is increased there is a decline in the water vapour permeability.

TABLE 6

Comparison of 50% Dry Cup (Mean 25%) WVP values

| Material | Density ($kg/m^3$) | Water Vapour Permeability (ng/m s Pa) |
|---|---|---|
| Low Density SPF | 7.5 | 87.5 |
| Wrapsulate Foam - no Skin | 16.80 | 37.50 |
| Wrapsulate Foam - with Skin | 18.66 | 26.83 |
| Polyisocyanurate Insulation | 26.5 | 4.425 |
| XPS | 28.6 | 1.22 |
| SPF | 39 | 2.49 |

Sorption Isotherm

Six specimens with a size of 150 mm×150 mm×25 mm were used in these measurements. The measurements were done following the procedure described in the ASTM Standard C1498 (ASTM International, 2004). The results of the test are shown in Table 7. The moisture content shown for 100% RH is the capillary saturation of the specimen. This value was obtained by immersing the specimen in water for a period of 4 days.

TABLE 7

Sorption Isotherm of Wrapsulate Foam

| | Moisture content (kg $kg^{-1}$) | |
|---|---|---|
| RH (%) | No skin | With skin |
| 50.8 | 0.0086 | 0.0091 |
| 70.7 | 0.0138 | 0.0151 |
| 90.4 | 0.0230 | 0.0239 |
| 93.5 | 0.0249 | |
| 100 | 1.293 | |

Water Absorption Coefficient

Measurements for determination of the water absorption coefficient were conducted in accordance with ISO 15148: 2002 (International Organization for Standardization 2002). Specimens, each having dimensions of approximately 50 mm×50 mm×50 mm, were used to determine the water absorption coefficient of the foam insulations. Over the course of the tests, water was maintained at 22±1° C. The results (average) from these measurements are shown in Table 8. The numbers in parentheses give the standard deviations.

TABLE 8

Water Absorption Characteristics of Wrapsulate Foam

| No skin | | With skin | |
|---|---|---|---|
| Square Root of Time ($s^{1/2}$) | Water Absorption (kg $m^{-2}$) | Square Root of Time ($s^{1/2}$) | Water Absorption (kg $m^{-2}$) |
| 0.0 | 0.000 (0.000) | 0.0 | 0.000 (0.000) |
| 24.5 | 0.026 (0.006) | 24.5 | 0.020 (0.006) |
| 34.6 | 0.028 (0.004) | 34.6 | 0.022 (0.009) |
| 42.4 | 0.033 (0.006) | 42.4 | 0.021 (0.003) |
| 60.0 | 0.038 (0.005) | 60.0 | 0.020 (0.005) |
| 73.5 | 0.040 (0.005) | 73.5 | 0.024 (0.005) |
| 84.9 | 0.041 (0.006) | 84.9 | 0.023 (0.005) |
| 103.9 | 0.045 (0.006) | 103.9 | 0.026 (0.005) |
| 120.0 | 0.047 (0.004) | 120.0 | 0.024 (0.004) |
| 147.0 | 0.049 (0.005) | 147.0 | 0.023 (0.003) |
| 169.7 | 0.049 (0.004) | 169.7 | 0.024 (0.004) |
| 283.8 | 0.050 (0.006) | 283.0 | 0.023 (0.003) |

The water absorption coefficient is obtained from a linear regression using all the data from the first linear part of the absorption process: The water absorption coefficients for the three foams are found to be extremely, low as shown below:

| With skin - | 0.00015 kg m−2 s−½ |
|---|---|
| No skin - | 0.00006 kg m−2 s−½ |

Air Permeability

The measurements and calculations were carried out according to the procedure reported by Kumaran and Bomberg (Kumaran, M. K., and M. T. Bomberg. ""A Test Method to Determine Air Flow Resistane of Exterior Membranes and Sheathings"." Journal of Thermal Insulation, 1986: 9: 224-235.). Three circular test specimens, with the same dimensions as the water vapour permeability specimens were used for the measurements. Measurements were executed at a temperature of 22±1° C.

The resulting air permeability for Wrapsulate—no skin (1.02±0.34)×10-5 L(75 Pa)−1·m·1·s-1

(1.62±0.48)×10-10 kg·Pa-1·m·1·s-1

(2.31±0.77)×10-15 m2

The resulting air permeability for Wrapsulate—with skin:

(8.79±2.82)×10-6 L(75 Pa)-1·m-1·s-1

(1.40±0.45)×10-10 kg·Pa-1·m-1·s-1

(1.99±0.64)×10-15 m2

Dimensional Stability

The dimensional stability of the foam when subject to thermal and humidity aging was assessed. This was done by following the standard test method of ASTM D2126-09, 'Standard Test Method for the Response of Rigid Cellular Plastics to Thermal and Humid Aging'. The specimens were tested according to following conditions:

Condition A: −20±3° C. & ambient RH for 28 days Condition B: 80±2° C. & ambient RH for 28 days Condition C: 70±2° C. & 97±3% RH for 28 days The change in absolute density of each of the specimens is shown In Table 9.

TABLE 9

Density Changes of Wrapsulate Foam

| | Density before aging, kg/m$^3$ | | | Density after aging, kg/m$^3$ | | |
|---|---|---|---|---|---|---|
| | −20° C. | 80° C. | 70° C., 97% RH | −20° C. | 80° C. | 70° C., 97% RH |
| with external skin | 18.6 | 18.4 | 18.3 | 18.6 | 18.0 | 18.2 |
| without skin | 17.2 | 17.6 | 17.4 | 17.2 | 17.3 | 17.4 |

Water Absorption—Full Immersion

In order to assess the water absorption of the foam testing was conducted following ASTM D2842-06 'Standard Test Method for Water Absorption of Rigid Cellular Plastics.' Since the foam does not exhibit rapid water absorption, Procedure B was used.

The dimensions and mass of the specimens were measured before the water absorption of the specimens. These are shown in Table 10.

TABLE 10

Initial Measurements of Water Absorption Specimens

| Specimen ID | Thickness (mm) | Length (mm) | Width (mm) | Mass (g) | Density (kg/m3) |
|---|---|---|---|---|---|
| 511-57-A | 47.84 | 152.12 | 152.44 | 19.026 | 17.15 |
| 511-57-B | 47.80 | 153.15 | 152.05 | 19.930 | 17.91 |
| 511-57-C | 51.08 | 153.13 | 151.95 | 19.924 | 16.76 |

The test specimens were then immersed in water for a period of 96 hours. The percent volume water absorption was calculated according to Procedure B in ASTM D2842. The results of the calculations are shown in Table 11. The results show average water absorption of 0.49%.

TABLE 11

Calculation of Percent Volume Water Absorption

| Spec. ID | Apparent Volume - V1 (cm$^3$) | Dry Weight, $W_1$ (g) | Weight of Submerged Jig, W2i (g) | Weight Initial Spec. + Jig, W3i (g) | Weight Final Spec. + Jig, W3f (g) | True Volume, $V_2$, cm$^3$ | Water Absorption by Volume (%) |
|---|---|---|---|---|---|---|---|
| 511-57-A | 1109.5 | 19.03 | 2089.3 | 1032.6 | 1034.9 | 1075.7 | 0.21 |
| 511-57-B | 1113.0 | 19.93 | 1564.6 | 500.7 | 510.9 | 1083.8 | 0.94 |
| 511-57-C | 1188.5 | 19.92 | 1581.1 | 443.8 | 447.6 | 1157.2 | 0.33 |

Discussion

The physical, hygrothermal and mechanical properties presented in the sections above clearly indicate that Wrapsulate foam as an insulation material has many promising characteristics. In particular, the foams of the present invention display a low water absorption capacity, and are able to act as both a water and air barrier, while still providing acceptable water vapour permeability. As such, the open cell foam materials of the present invention are suitable for exterior foam applications.

For commercial applications, the foams of the present invention preferably have the performance characteristics shown in Table 12.

TABLE 12

| Performance Characteristics | | |
|---|---|---|
| Attribute | Test | Results |
| Density | ASTM D1622 | 1.07 lb/ft$^2$ |
|  |  | 17.2 Kg/m$^3$ |
| Aged Thermal Resistance (90 Day) | ASTM CG518 25 mm | R 4.3 RSI .75 |
| Thermal Resistance After Ice Lens | NRC TG 072510.09 | 100% Retention |
| Water Vapour Permeation | ASTM E96 25 mm | 1175 ng/(Pa · s · m$^2$) |
| Water Vapour Permeation | ASTM E96 50 mm | 949 ng/(Pa · s · m$^2$) |
| Initial Tensile Strength | ASTM 1623 | 13.6 psi, pass 94 kPa, pass |
| Tensile Strength After Ice Lens | ASTM 1623 | 103% Retention |
| Water Absorption (% by Volume) | ASTM D2842 | 1.6% |
| UV and Heat Aged Water Absorption (% by Volume) | QUV as per NRC TG 072510.09 | 2.3% |
| Water Penetration Resistance | ASTM E331 as per NRC TG 072510.09 | 700 Pa |
| Flame Spread | ULC S-102 Steiner Tunnel | Flame <500 Smoke <500 |
| VOC Emission | CAN/ULC S774-09 | Passed |
| Dimensional Stability (Volume Change after 28 days) | ASTM D2126 | −20° C. .008% 80° C. −9% 70° C. @ 97% RH. 2.3% |
| Fungi Resistance | ASTM C1338 | No Growth |
| Open Cell Content | ASTM D6226 | 99% |
| Compression Strength | ASTM 1621 NRC Performance | 60 kPa |
| Flexural Strength | ASTM C203 NRC Performance | 16.07 kPa |
| Sorption Isotherm (4 day Immersion) | ASTM C1498 NRC Performance | .02 Kg Kg$^{-1}$ |
| Water Absorption Coefficient (% by Volume) | ISO 15148 NRC Performance | .00015 Kg m$^{-2}$s$^{-1/2}$ |
| Full Scale Wall Test Temperature Limits | NRC TG 072510.09 | 5° C. to 40° C. |
| Adhesion to Substrates | NRC TG 072510.09 | Various See TG |
| Density Variation | ASTM D1622 NRC Performance | 1% |
| All Tests Performed On Samples With and Without Skin | NRC Performance Assessment | PASS |
| CCMC # |  | 14049-R |

Thus, it is apparent that there has been provided, in accordance with the present invention, an open cell polyurethane foam, for use in insulation of the exterior surfaces of a building, which fully satisfies the goals, objects, and advantages set forth hereinbefore. Therefore, having described specific preferred embodiments of the present invention, it will be understood that alternatives, modifications and variations thereof may be suggested to those skilled in the art, and that it is intended that the present specification embrace all such alternatives, modifications and variations as fall within the scope of the appended claims.

Additionally, for clarity and unless otherwise stated, the word "comprise" and variations of the word such as "comprising" and "comprises", when used in the description and claims of the present specification, is not intended to exclude other additives, components, integers or steps. Further, the invention illustratively disclosed herein suitably may be practised in the absence of any element which is not specifically disclosed herein.

Moreover, words such as "substantially" or "essentially", when used with an adjective or adverb is intended to enhance the scope of the particular characteristic; e.g., substantially planar is intended to mean planar, nearly planar and/or exhibiting characteristics associated with a planar element.

Further, use of the terms "he", "him", or "his", is not intended to be specifically directed to persons of the masculine gender, and could easily be read as "she", "her", or "hers", respectively.

Also, while this discussion has addressed prior art known to the inventor, it is not an admission that all art discussed is citable against the present application.

What is claimed is:

1. A method for insulating the exterior surface of a building comprising spraying the exterior surface of the building with a mixture of an isocyanate resin and a polyol to produce a polyurethane foam, wherein said polyurethane foam is prepared by reacting the isocyanate resin, as an A component, with a B Component comprising the polyol, an optional blowing agent, and at least one surfactant, and said polyurethane foam has an open cell structure, and wherein said open cell structure comprises cells which are essentially open, but also includes some randomly occurring, solid cell walls, wherein said polyurethane foam has a foam density of between 0.60 and 1.5 lb. per cubic foot, and has a cell size of between 0.03 µm and 1.5 µm, so that said polyurethane foam acts as a water and air barrier, while also being water vapor permeable.

2. The method of claim 1, wherein said polyurethane foam has a foam density of between 1.00 and 1.15 lb. per cubic foot.

3. The method of claim 1, wherein said polyurethane foam is prepared by reacting a mixture of said A Component with said B Component at a weight ratio of from 0.5 to 5:1.

4. The method of claim 1, wherein said polyurethane foam is prepared by reacting a mixture of said A Component with said B Component at a weight ratio of from 0.9 to 1.1:1.

5. The method of claim 1, wherein said isocyanate resin is a resin selected from MDI, PMDI, TDI, TDA, HMDI, HDI, IPDI and TMXDI.

6. The method of claim 1, wherein said polyurethane foam is prepared by reacting a mixture of PMDI, as said A Component with said B Component at a weight ratio of about 1:1.

7. The method of claim 1, wherein said polyol is selected from the group of aliphatic or aromatic polyols, polyester, polyether, sucrose-based polyols, glycerine-based polyols, or caprolactone-based polyols.

8. The method of claim 7, wherein said polyol is prepared by reacting ethylene oxide (EO), propylene oxide (PO) or butylene oxide (BO) with glycerine, sucrose, 1,1,1-tris[(2- hydroxyethoxy)methyl]ethane, 1,1,1,-tris-[(2-hydroxypropoxy)methyl]propane, triethanolamine, triisopropanolamine, pyrogallol or phloroglucinol, in order to form a chain-extended polyol.

9. The method of claim 1, wherein a blowing agent is used, and wherein said blowing agent is water, or wherein said blowing agent is a blowing agent which releases carbon dioxide.

10. The method of claim 1, wherein said surfactant is a mixture of an open-cell promoting surfactant and a closed-cell promoting surfactant.

11. The method of claim 1, wherein said polyurethane foam is formed by a combination of surfactants that results in a surfactant interaction which produces both completely open and at least partially open, cell walls.

12. The method of claim 1, wherein the open cell content of the polyurethane foams is greater than 95%, by number.

13. The method of claim 1, wherein said B Component additionally comprises a flame retardant.

14. The method of claim 1, wherein said open cells have a cell size of between 0.1 µm and 1.0 µm.

15. The method of claim 1, wherein said open cells have a cell size of 0.8±0.3 µm.

16. The method of claim 1, wherein said foam has an R value of between 2 and 6 per inch of thickness.

17. The method for insulating as claimed in claim 1, wherein said open cell polyurethane foam is used to insulate the exterior surface of a wall of said building, and a closed cell polyurethane foam is used to insulate the interior surface of said wall.

18. The method for insulating as claimed in claim 1, wherein said polyurethane foam is used in place of tape to seal a sheathing material.

19. The method for insulating as claimed in claim 1, wherein said open cell polyurethane foam is applied to a sheathing material to provide a polyurethane foam layer on the sheathing material.

20. The method for insulating as claimed in claim 19, further comprising covering said open cell polyurethane foam layer with brick, wood, wood siding, wood composite siding, vinyl siding, or aluminum siding.

21. A method for insulating the exterior surface of a building comprising:
spraying a mixture of an isocyanate resin and a polyol onto a sheathing material of the building to produce a polyurethane foam layer on the sheathing material, wherein said foam is prepared by reacting the isocyanate resin, as an A component, with a B Component comprising the polyol, an optional blowing agent, and at least one surfactant, and said polyurethane foam layer having an open cell structure comprising cells which are essentially open, but also includes some randomly occurring, solid cell walls, wherein said polyurethane foam has a foam density of between 0.60 and 1.5 lb. per cubic foot, and has a cell size of between 0.03 µm and 1.5 µm, so that said polyurethane foam layer acts as a water and air barrier, while also being water permeable; and
covering said open cell polyurethane foam layer with brick, wood, wood siding, wood composite siding, vinyl siding, or aluminum siding.

* * * * *